(12) United States Patent
Mistry et al.

(10) Patent No.: US 12,246,875 B2
(45) Date of Patent: Mar. 11, 2025

(54) CROSS SEALING DEVICE

(71) Applicant: Mamata Machinery Private Limited, Gujarat (IN)

(72) Inventors: Hemang Rameshchandra Mistry, Ahmedabad (IN); Akbarali Y. Momin, Ahmedabad (IN)

(73) Assignee: Mamata Machinery Private Limited, Ahmedabad (IN)

( * ) Notice: Subject to any disclaimer, the term of this patent is extended or adjusted under 35 U.S.C. 154(b) by 0 days.

(21) Appl. No.: 18/236,553

(22) Filed: Aug. 22, 2023

(65) Prior Publication Data

US 2024/0083610 A1 Mar. 14, 2024

(30) Foreign Application Priority Data

Sep. 13, 2022 (IN) .............................. 202221052112

(51) Int. Cl.
*B65B 9/087* (2012.01)
*B65B 51/30* (2006.01)

(52) U.S. Cl.
CPC ............ *B65B 9/087* (2013.01); *B65B 51/306* (2013.01)

(58) Field of Classification Search
CPC ....... B65B 9/087; B65B 51/306; B65B 51/10; B65B 2051/105; B29C 66/1122; B29C 66/849; B29C 65/18; B29C 66/4312; B29C 66/4322; B29C 65/305; B29C 66/8161; B29C 66/49; B29C 66/8242; B29C 66/133; B29C 66/71
See application file for complete search history.

(56) References Cited

U.S. PATENT DOCUMENTS

| 5,377,474 A | * | 1/1995 | Kovacs | B65B 9/213 53/64 |
| 2004/0159075 A1 | * | 8/2004 | Matthews | B65B 61/188 53/450 |
| 2008/0066430 A1 | * | 3/2008 | Lubezny | B29C 66/1122 53/451 |

* cited by examiner

*Primary Examiner* — Veronica Martin
(74) *Attorney, Agent, or Firm* — Amster, Rothstein & Ebenstein LLP (57) ABSTRACT

A cross seal device 100 is provided. The device 100 comprising a cross sealing table X having a cross sealing station (A) and a toggle assembly (B). The cross sealing station (A) comprising a front seal assembly (1) and a rear seal assembly (2) configured to engage and disengage by controlled oscillation of first pair of C shaped actuator levers (6c, 6d) and second pair of C shaped actuator levers (6a, 6b) via sealing drive shaft (5) of toggle assembly B. The cross sealing station (A) performs horizontal reciprocating action for sealing. The cross sealing device 100 further comprising Cross Sealing Up Down control assembly C which controls vertical reciprocating movement of cross sealing table X employing Stripping System D to ensure no PIS (Product in Seal) and improves packaging capacity.

13 Claims, 10 Drawing Sheets

CROSS SEALING DEVICE

FIELD OF INVENTION

The present disclosure relates generally to a cross sealing device. In particular, the present disclosure relates to a cross sealing device for a Vertical Form Fill Seal machine for achieving high speed sealing during package manufacturing.

BACKGROUND

In the packaging industry, flexible packaging is widely used mainly for consumer goods, such as food and beverages. However, Flexible packaging is useful for packaging any solid, liquids and other flowable materials. These packages are commonly formed, filled, and sealed by a Vertical Form, Fill, Seal ("VFFS") machine.

VFFS machines usually produce filled and sealed bags or pouches from a flexible packaging material, although they can also be used to produce empty bags which can be filled and sealed subsequently. In normal operation, a web unwind from a roll is formed into a tube with the side edges folded and ends of the folded film overlapped or formed with a center fin and sealed while the film is transferred downwards along a vertical transfer route. The lower end of the tubular film is sealed transversely, majorly by heat and pressure. The products are filled into the formed tubular film in measured quantity and the upper end of the tubular film is also transversely sealed to separate the sealed tubular film from the tube above so that packaging bags, each having the product sealed therein, are produced in sequence. Transverse or Cross Sealing Jaws performs top and bottom seals simultaneously. Bags are either separated by transverse sealing jaws or perforated between the two consecutive bags. Thus, transverse sealing jaws seals filled tube's top and bottom ends, perforation cutter in the sealing assembly's jaws operates within the sealing jaws to perform perforation-cut to form filled chain pouches or full through cut to form individual filled pouches, it is depending on selection to form pouches.

However, majority of VFFS machines incorporate stationery sealers having front seal jaws and rear seal jaws which engage together to seal a fixed length of a web tube at predetermined intervals in a direction transverse to the longitudinal extension. That is, stationery seal jaws of the conventional sealers first move forward in an engaging position to perform sealing on web tube passed there between, followed by retracting back at a fixed distance sufficient to allow the filled package to pass through until the predetermined web tube for forming next package is arrived for the sealing. That is, cross sealers are non-functional for a period of time while a packaged bag is passed and until the next length of web tube is arrived at a fixed location between the sealing jaws. This is intermittent motion web or film travel based VFFS Machine where web or film only moves and transvers/cross sealing jaws are fix at one location. In such system vertical seal is performed with sealing jaw when web or film stops or stationery. This limits the production capacity of the VFFS machine.

Further, the conventional cross seal jaws are configured to retract back at a fixed distance irrespective of the size of the filed pouch. Such fixed distance retraction is mostly excess than that is required especially while making smaller packages. This further prolongs sealing operation and limits the number of packages formed.

Hence, there is a much long-felt need for a providing a cross sealing device that reduces time required for sealing operation and increases packaging speed to enhance production capacity of a VFFS machine.

OBJECTIVES OF THE INVENTION

An object of the invention is to provide a cross sealing device that increases production capacity by shortening the time required for sealing operation while manufacturing of large number of packages. The sealing operation is performed on continuously moving web both for vertical lap/fin seal as well as, transverse/cross seal.

Still another object of the invention is to provide a cross sealing device that increases the packaging speed.

Another object of the invention is to provide a cross sealing device that enables controlled retraction of the sealing jaws depend upon the size of the filled package to increase production capacity.

Still another object of the invention is to provide a cross sealing device that enables controlled retraction of the sealing jaws depend upon the size of the filled package to increase production capacity using toggle crank mechanism which has a fixed eccentricity and oscillating movement.

Yet another object of the invention is to provide a cross sealing device that enables synchronization of the package sealing time with package drawing speed.

Still another object of the invention is to provide a cross sealing device that perform sealing simultaneously with drawing of the filled package.

Still another object of the invention is to provide a stripping action in vertical travel while film/web is being drawn for the product being filled to securely drop in the bag/pouch, while cross sealing operation being performed at the same time to avoid Product in Seal (PIS) and to produce final filled package with-out seal contamination.

SUMMARY

In accordance with an embodiment of the present disclosure, a cross sealing device is provided. A cross sealing device comprising cross sealing table X, which is comprising a cross sealing station A and a toggle assembly B. The cross sealing station comprising a front seal assembly comprising a first seal jaw with a perforation blade, and a rear seal assembly comprising a second seal jaw with a perforation slot configured to receive the perforation blade into engagement with the first seal jaw, a pair of parallel linear motion rods, wherein the front seal assembly is fixedly mounted at front end of the pair of parallel linear motion rods, and a back connecting plate is fixedly mounted at rear end thereof.

The toggle assembly is comprising a sealing drive shaft provided perpendicularly between the pair of parallel linear motion rods, a pair of cross connecting lever fixedly mounted with sealing drive shaft, a first pair of C shaped actuator levers fixedly connected with a rear seal assembly at front end thereof, a second pair of C shaped actuator levers fixedly connected with the back connecting plate at rear end thereof, wherein the rear end of the first pair of C shaped actuator levers and back end of the second pair of C shaped actuator levers are rotatably connected with each of cross connecting lever at opposite ends thereof. The cross sealing device further comprises a first timing pulley mounted on sealing drive shaft to control oscillation of the sealing drive shaft, and a first servo motor configured to control oscillation of the timing pulley.

In an embodiment of the invention, the device further comprises a cross seal vertical up down control assembly comprising a cross seal up down plate which slides on a pair of linear motion rails mounted on a rail mounting plate at one end via a pair of parallel linear motion guide blocks wherein the cross seal up down plate, at another end, is fixed with timing belt which is oscillating vertically on a first driver timing pulley and a second driven timing pulley attached with rail mounting plate. Thus cross sealing table X oscillates with rotation of servo motor mounted with driver timing pulley.

In an embodiment of the invention, the cross sealing device further comprises an up-down drive shaft and a second servo motor to control vertical movement of the cross sealing station on pair of linear motion rails mounted on the rail mounting plates. The second servo motor controls vertical movement of the cross sealing station by controlling reciprocation of cross seal up down plate by driving timing pulley which actuates/reciprocates timing belt which is also coupled with fixed/idler second timing pulley. The cross sealing table's reciprocation travel length depend upon the length of the pouch to be manufactured.

The first pair of C shaped actuator levers are configured to pull back the rear seal assembly upon rotation of the sealing drive shaft in clockwise direction, to disengage the front seal assembly and the rear seal assembly. The first pair of C shaped actuator levers are configured to advance the rear seal assembly upon rotation of the sealing drive shaft in counter-clockwise direction, to engage the front seal assembly with the rear seal assembly. Pair of parallel linear motion rods are configured to disengage the front seal assembly from rear seal assembly upon forward sliding of the back connecting plate and to engage the front seal assembly and the rear seal assembly upon rearward sliding of the back connecting plate.

In a preferred embodiment of the invention, the first servo motor is configured to control horizontal movement of the front seal assembly and the rear seal assembly by controlling the rotation of the sealing drive shaft via the first timing pulley and Timing Belt. The toggle assembly enables the front seal assembly and the rear seal assembly to horizontally reciprocate in a controlled rotation manner with crank eccentricity value half of the length of cross connecting lever.

In a preferred embodiment of the invention, an opening gap g created between the front seal assembly and the rear seal assembly upon disengagement has maximum distance up to 180 mm which is four times the crank eccentricity value.

The cross sealing device comprises an up-down drive shaft and a second servo motor to control vertical movement of the cross sealing station on pair of linear motion rails mounted on the rail mounting plates depend upon the length of the pouch to be manufactured.

The cross sealing device further comprises a stripping system comprising a pair of stripper rod, a pair of stripper stopper, a pair of stripper spring and two pair of spring stopper. The stripping system has each of pair of stripper rod, stripper stopper, stripper spring and spring stopper provided above any one of the first seal jaw and the second seal jaw in a position slightly ahead thereof making the pair of stripper rod grab the package few seconds before the first seal jaw and the second seal jaw.

Here, the first seal jaw and the second seal jaw are can be controllably moved horizontally by controlling rotation of the sealing drive shaft. In the disengagement position, the opening gap g is created between the first seal jaw and the second seal jaw. The present invention provides for controlling the opening gap g between of first seal jaw and the second seal jaw for a distance as required depend upon the width of the filled package. This resolves problem of reduced packaging capacity by enabling the first seal jaws and second seal jaws to perform sealing while the package is drawn downward continuously. The cross sealing device of the present invention uses the toggle mechanism to ensures at disengagement, maintenance of a controlled opening gap g (depending on pouch width) to clear filled pouch to travel through and at engagement, also ensures controlled sealing pressure for sealing. Two parameters of sealing i.e. Sealing Pressure & Sealing Time are well controlled to suit processing requirements. The controlled gap opening of seal jaws results in higher throughput or speed of processing of filled pouches/package.

BRIEF DESCRIPTION OF DRAWING

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

FIG. 7a-7e shows a downward cycle of cross sealing device in accordance with an embodiment of the present disclosure.

FIG. 8a-8e shows upward cycle of cross sealing device in accordance with an embodiment of the present disclosure.

DETAILED DESCRIPTION

The detailed description set forth below in connection with the appended drawings is intended as a description of certain embodiments of a cross sealing device and is not intended to represent the only forms that may be developed or utilized. The description sets forth the various structure and/or functions in connection with the illustrated embodiments; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, steps, operations, units and/or components, but do not forbid the presence or addition of one or more other features, steps, operations, components, and/or groups thereof. The particular order of steps disclosed in the method and process of the present disclosure is not to be construed as necessarily requiring their performance as described or illustrated. It is also to be understood that additional or alternative steps may be employed. When an element is referred to as being "mounted on", "engaged to", "connected to" or "coupled to" another element, it may be directly on, engaged, connected or coupled to the other element. As used herein, the term "and/or" includes any and all combinations of one or more of the associated listed elements.

Figure 1:
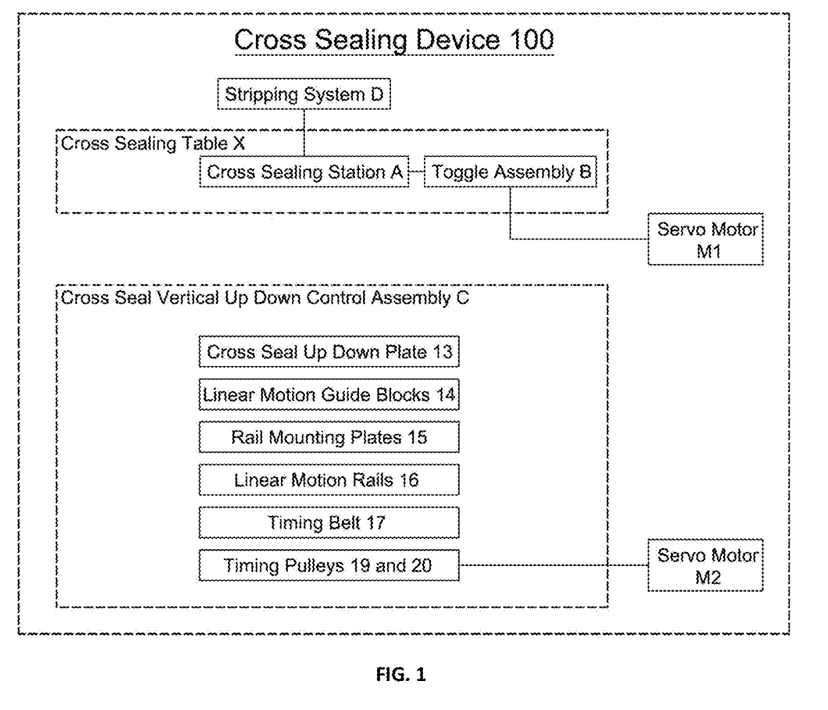
FIG. 1 shows a schematic representation of different part of a cross sealing device in accordance with a preferred embodiment of the present disclosure.

For the purposes of the description herein, the terms "top", "bottom", "right", "left", "rear", "front", "vertical", "horizontal", and derivative terms for them shall relate to the disclosures associated in FIG. 1. Unless otherwise stated, the term "forward" refers to the surface of the device closer to the person intended to see the device, and the term "rear" is refers to the surface of the device away from the person intended to see the device. However, it should be understood that the invention can take a variety of alternative orientations, except as conversely specifically specified.

It should also be understood that the particular devices and processes illustrated in the accompanying drawings and described in the following specification are merely exemplary embodiments of the invention concept defined in the appended claims. Therefore, the specific dimensions and other physical properties of the embodiments disclosed herein should not be considered limiting unless the claims expressly state otherwise.

As used herein, the term "package" refers to packaging materials configured around a product being packaged, and can comprise (but is not limited to) bags, pouches, trays, and the like. In some embodiments, the term "package" encompasses flexible and/or rigid packages made of plastics (mono & multilayer), plastic laminates, paper laminates, polymers and the like.

As used herein, the term "seal" can refer to any seal of a first region of a film surface to a second region of a film or substrate surface. In some embodiments, the seal can be formed by heating the regions to at least their respective seal initiation temperatures using a heated bar, hot air, infrared radiation, ultrasonic sealing, and the like. In some embodiments, the seal can be formed by an adhesive. Such adhesives are well known in the packaging art. Alternatively or in addition, in some embodiments, the seal can be formed using a UV or e-beam curable adhesive seal.

As used herein, the term "product" is interchangeable with the term "item". Such product refers to food or beverage product which is packaged for purpose of secured transport and/or increasing shelf life. For example, product to be packaged can be, but not limited thereto, snacks, beverages, nutritional supplements, vitamins, beauty products, personal care products, weight loss products, skin care products etc. Snacks are preferably, but not limited thereto, crispy snack food products, such as tortilla chips, potato chips, corn chips, fruit and vegetable chips, crackers and pretzels, fryums, namkeen etc. which produces floating particles of seasoning while the product is being filled in the package.

This invention is related to a package manufacturing machine of the type adapted to simultaneously make packages from film or web and fill them with items to be packed such as food or beverage items with high efficiency. In particular, this invention relates to a cross sealing device intended for use in such a packaging machine for sealing a package in a transverse direction after it has been filled with items to be packed.

FIG. 1 shows a schematic representation of the different component of the cross sealing device 100 in accordance with a preferred embodiment of the invention. The cross sealing device comprises a cross sealing table X, cross seal vertical up down control assembly C, stripping system D. The cross sealing table X comprises "cross sealing station A" to perform cross-sealing, and a "toggle assembly B" to control cross sealing operation. The cross sealing device further comprises a Cross Seal Vertical Up Down Control Assembly C and Stripping System D.

Figure 2A:
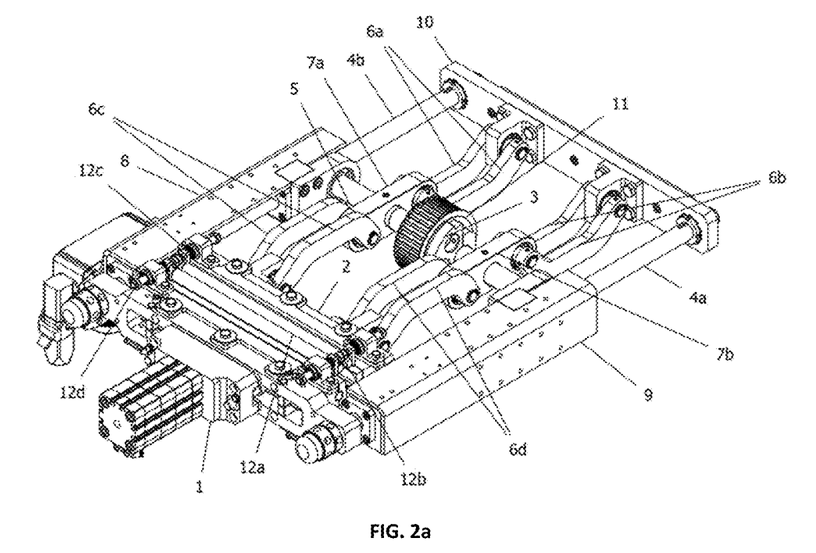
FIG. 2a is a top isometric part-view of cross sealing table of the cross sealing device in accordance with a first embodiment of the present disclosure.
Figure 2B:
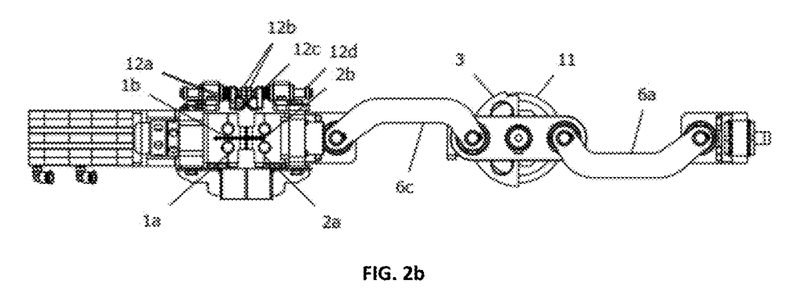
FIG. 2b is a part side-view of the cross sealing table of the cross sealing device in accordance the first embodiment of the present disclosure.
Figure 2C:
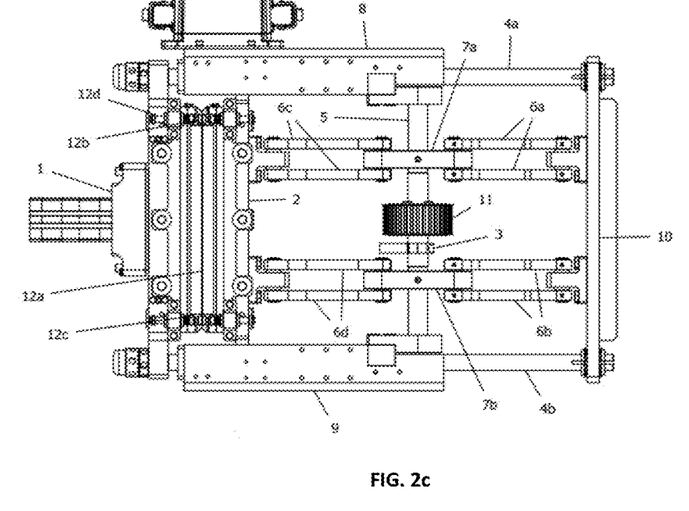
FIG. 2c is a top view of the cross sealing table of the cross sealing device in accordance the first embodiment of the present disclosure.
Figure 3A:
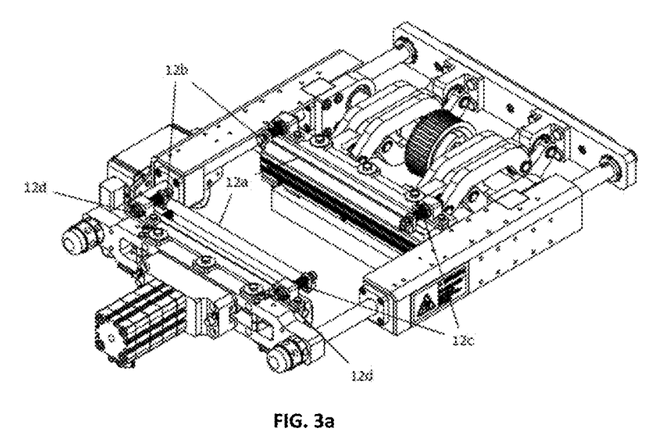
FIG. 3a is a top isometric view of the cross sealing table of the cross sealing device in accordance with a second embodiment of the present disclosure.
Figure 3B:
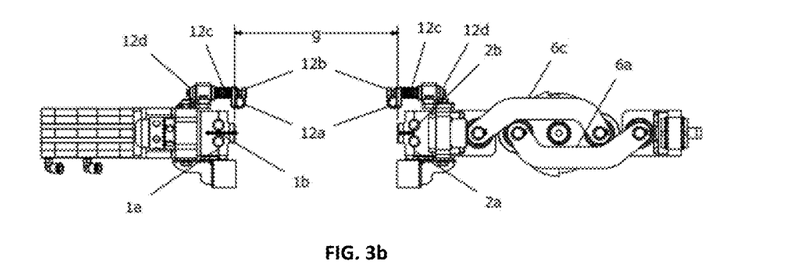
FIG. 3b is a part side-view of the cross sealing table of the cross sealing device in accordance with the second embodiment of the present disclosure.
Figure 3C:
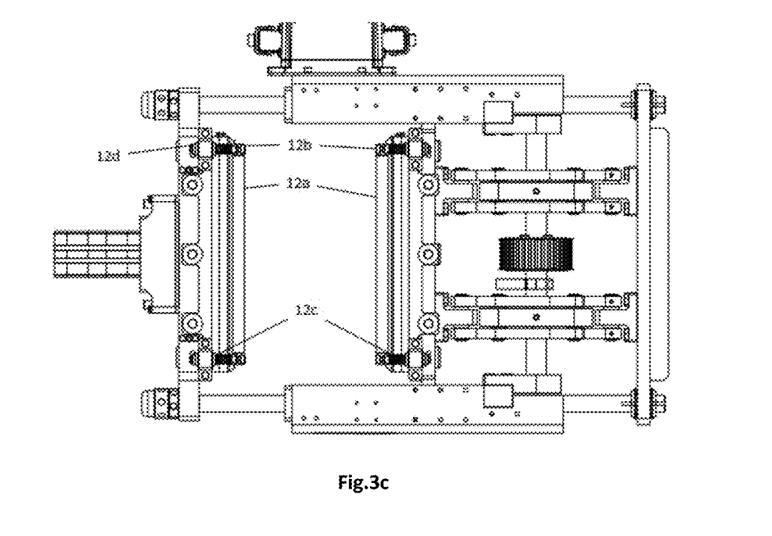
FIG. 3c is a top view of cross sealing table of the cross sealing device in accordance the second embodiment of the present disclosure.

FIGS. 2a-2c and 3a-3c depict a cross sealing table X of cross sealing device 100 in accordance with a first embodiment and a second embodiment of the present disclosure, respectively. FIG. 2a-2c shows a configuration of cross sealing table X while performing a sealing operation, i.e., a sealing position or closed position. FIG. 3a-3c shows a configuration of the cross sealing table X when not performing the sealing operation, i.e., disengaged or open position.

The cross sealing station A comprises a front seal assembly 1 and a rear seal assembly 2. The cross sealing station A further comprises a pair of parallel linear motion rods 4a, 4b referred as "linear motion rods" hereinafter for brevity. The front seal assembly 1 is fixedly mounted with front end of the pair of parallel linear motion rods 4a, 4b. The cross sealing station A further comprises a back connecting plate 10 which is fixedly mounted with rear end of each of the linear motion rod 4a, 4b.

As depicted in FIGS. 2b and 3b, the front seal assembly 1 has a first seal jaw 1a with a perforation blade 1b and the rear seal assembly 2 has the second seal jaw 2a and a perforation slot 2b. When the front seal assembly 1 and the rear seal assembly 2 are in an engaging position, the perforation slot 2b of the second seal jaw 2a is adapted to receive perforation blade 1b of the front seal assembly 1 to perform perforation or cutting of the filled package, as desired. The toggle assembly B is configured to control the distance between the first seal jaw 1a and the second seal jaw 2a by controlling the horizontal movement of the front seal assembly 1 and the rear seal assembly 2 relative to each other via toggle crank mechanism. The toggle assembly B comprises a sealing drive shaft 5 which is mounted perpendicularly between the pair of parallel linear motion rods 4a, 4b and has a pair of cross-connecting levers 7a, 7b and a first timing pulley 11 mounted fixedly thereon. The toggle assembly B further comprises a first pair of C shaped actuator levers 6c, 6d and a second pair of C shaped actuator levers 6a, 6b connected to opposite end of each of the cross connecting lever 7. The front end of the first pair of C shaped actuator levers 6c, 6d are connected with the rear seal assembly 2 and rear end of the second pair of C shaped actuator levers 6a, 6b are fixedly connected with the back connecting plate 10. In a preferred embodiment of the invention, the first pair of C shaped actuator levers 6c, 6d and the second pair of C shaped actuator levers 6a, 6b are faced oppositely. That is, the first pair of C shaped actuator levers 6c, 6d are facing downwardly while the second pair of C shaped actuator levers 6a, 6b facing upwardly and vice versa.

More specifically, each of the first pair of C shaped actuator levers 6c, 6d has their front end fixedly connected with the rear seal assembly 2 and the rear end is in rotatory connection with the cross connecting lever 7, which is mounted on seal drive shaft 5. This arrangement enables the controlled retraction (or advancement) of the rear seal assembly 2 relative to the clockwise (or counter-clockwise) rotational movement of the seal drive shaft 5 for effectively performing sealing operation. This will be clearer with reference to FIG. 3a-3c.

FIG. 3a-3c shows the cross sealing table X of cross sealing device 100 in accordance with a second embodiment of the present disclosure, that is when not performing the sealing operation, i.e., disengaged position or open position. Illustratively, when the seal drive shaft 5 oscillates in clockwise direction, the first pair of C shaped actuator levers 6c, 6d are pivoted backward pulling back the rear seal assembly 2 therewith, i.e. disengages the second seal jaws 2a from the first seal jaws 1a as depicted in FIG. 3b.

Each of the second pair of C shaped actuator levers 6a, 6b has their rear end fixedly connected with the back connecting plate 10 and front end thereof is rotatably connected with an end of the cross connecting lever 7 opposite to the end to which the first pair of C shaped actuator levers 6c, 6d are connected. Hence, the clockwise rotation of the seal drive shaft 5 forces the back connecting plate 10 to the front direction. As the back connecting plate 10, the linear motion rods 4a, 4b and the front seal assembly 1 are in fixed connection, clock wise oscillation of the seal drive shaft 5 causes the front seal assembly to be trailed with the back connecting plate 10, i.e. disengaging first seal jaws 1a from the second seal jaws 2a as depicted in FIG. 3a-3c. That is, when seal drive shaft 5 oscillates clockwise both the first seal jaw 1a and the second seal jaw 2a are retracted and disengaged in a controlled manner.

As shown in FIG. 3b, disengagement of the first seal jaw 1a and the second seal jaw 2a creates an opening gap g therebetween. This opening gap is controlled relatively to a width of the package formed after filling product into the tubular film. This gap g is sufficient to allow smooth traversal of the formed package. In a preferred embodiment of the invention the opening gap g is same as width of the formed package. In still preferred embodiment of the invention, the opening gap g is not less than the width of the package to be formed. In a preferred embodiment of the invention, an opening gap g created between the front seal assembly 1 and the rear seal assembly 2 has maximum distance up to 180 mm, which is 4 times the crank eccentricity value.

Alternatively, when sealing drive shaft 5 is oscillated in counter clock-wise direction, the first pair of C shaped actuator levers 6c, 6d and the second pair of C shaped actuator levers 6a, 6b are extended back to the position shown in FIG. 2a-2c and cross sealing is performed in a controlled manner. For cross sealing operation, sealing drive shaft 5 is oscillated in counter clock-wise direction for the programmed rotational movement for a certain value, which is derived on eccentricity i.e. half of the Cross Connecting Lever 7a, 7b and which is defined for Sealing Jaws closed condition. Here, Sealing Jaws closed position with the formed tubular film in between the Sealing Jaws for sealing is a just touch condition of sealing jaws and considered as film thickness distance value as sealing pressure count. Lesser count then Sealing Jaws closed position i.e. just touch condition controls the pressure value lesser then the distance of the film thickness and squeezes the film layers in contact lesser. The movement or travel of jaws further more than the rotation value which is a jaws closed position, exerts penetration pressure for the sealing jaws for the extra sealing pressure required.

The first timing pulley 11 is mounted on sealing drive shaft 5 and a first servo motor M1 is provided to control the rotation of the sealing drive shaft 5 and thereby the sealing operation. The first servo motor M1 controls the rotation of the first timing pulley 11 for a predetermined rotational value in a clockwise or counter clock wise direction to achieve oscillation of the sealing drive shaft to achieve engagement or disengagement of the seal jaws in manner as explained above as also shown in FIGS. 2a-2c and 3a-3c. Details are not repeated herein.

The stripping system D comprises a pair of stripper rod 12a, a pair of stripper stopper 12b, a pair of stripper spring 12c and two pair of spring stopper 12d (see FIG. 2a). The stripping system D ensure product being pushed down in the package securely prior to closing of seal jaws for sealing operation. In particular, the pair of stripping rod 12a set for desired gap required to strip filling product's particles in the tubular film before closing of seal jaws while simultaneously pushing the product particles, floating inside the package while product is being filled, downward within the package before actual sealing operation starts and thus minimizes the possibilities of having product in seal (PIS) and thereby avoid problems which may arise due to product entrapped within seal, such as inadequate seal formation or seal contamination which may cause leakage etc. In a preferred embodiment of the invention, stripper rods 12a are provided with a sleeve, more particularly a silicon rubber sleeve. Cross sealing device may further comprises a means viz. silicon foam rubber strips 21a, 21b below the sealing jaws 1a and 2a to which control the air in Pouch.

The cross sealing table X may comprise a linear motion bushing (not shown) to guide the motion of the linear motion rods 4a, 4b to retract and extend the front seal assembly 1. Linear motion rods 4a, 4b and linear motion bushing may be implemented within a housing 8, 9.

Figure 4:
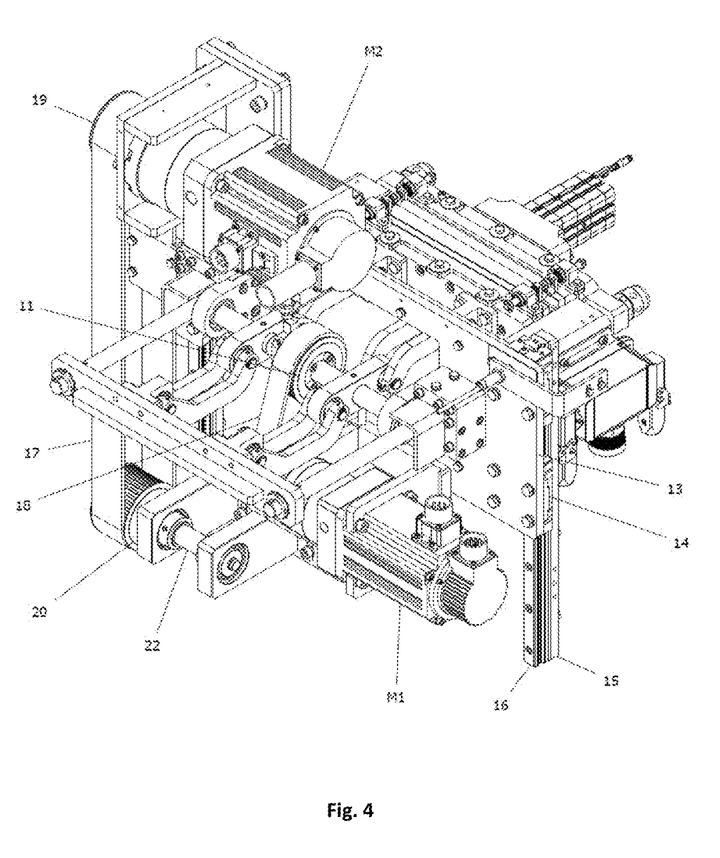
FIG. 4 is a rear-left side isometric view of a cross sealing device in accordance with an embodiment of the present disclosure.
Figure 5:
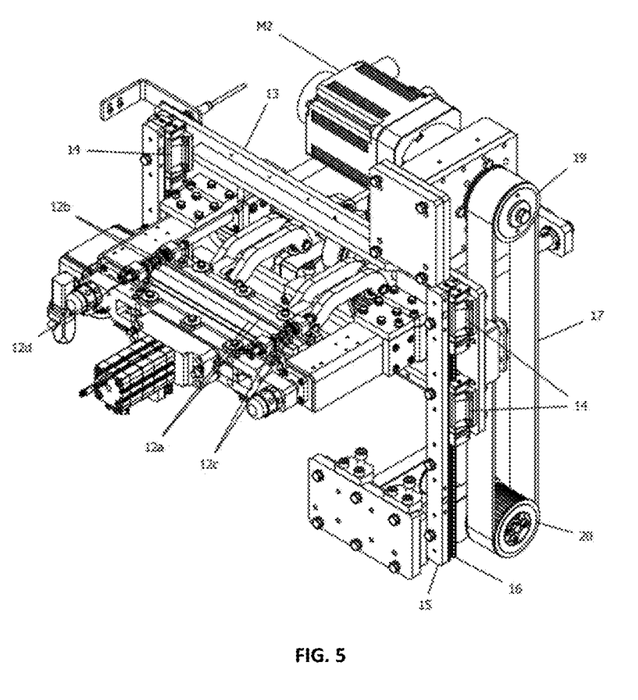
FIG. 5 is a front-right side isometric view of a cross sealing device in accordance with an embodiment of the present disclosure.

FIGS. 4 and 5 show rear-left and front-right side isometric views of the cross sealing device 100 respectively, which shows cross seal vertical up down control assembly C (referred to as "assembly C" hereinafter for brevity) adapted to control the vertical up and down movement of the cross sealing table. Assembly C comprising cross seal up down plate 13, linear motion guide blocks 14, rail mounting plates 15, a pairs of linear motion rails 16, timing belt 17, first driver timing pulley 19 and driven timing pulley 20 and servo motor M2. The cross sealing table X moves up-down vertically with cross seal up down plate 13 on pairs of linear motion rails 16 which are mounted on rail mounting plates 15 at one end of the cross seal up down plate 13 via linear motion guide blocks 14. Cross seal up down plate 13 is further attached with the timing belt 17 at the opposite end. The timing belt 17 is driven by first driver timing pulley 19 and idler timing pulley 20. The second servo motor M2 controls the reciprocation of the first driver timing pulley 19. Cross seal vertical up down control assembly C forms a vertical reciprocating up-down movement. As shown in FIG. 5, vertical reciprocation of the timing belt 17 by the first driver timing pulley 19 causes to reciprocation of cross seal up down plate 13 and thereby the cross sealing table X therewith through via linear motion guide blocks 14. Thus cross sealing table X oscillates with the oscillatory rotation of the second servo motor M2. Device 100 further comprises up-down drive shaft 22 which is connected with a second servo motor M2 to control vertical movement of the cross sealing table X on pair of linear motion rails 16 mounted on the rail mounting plates 15.

The cross sealing table X may also include a Proximity Segment 3 provided on the seal drive shaft 5, which is configured to be sensed by a proximity sensor not shown). In a preferred embodiment of the invention, the proximity sensor is a proximity switch. However, the kind of proximity sensor is not limited herein. The cross sealing device include a controller which controls operating parameter like web draw, package length, sealing time, sealing pressure, sealing temperature based on the user input. The proximity sensor is configured to feedback the position of first seal jaw 1a and second seal jaw 2a based on the position of proximity segment 3. That is, first seal jaw 1a and second seal jaw 2a can be in engaging position as shown in FIG. 2b or in disengaging frilly retracted position as shown in FIG. 3b.

In the controlled oscillation movement of the servo motor M1 for the cross sealing mechanism, for sealing operation, the servo motor M1 operates and rotates the sealing drive shaft 5 in a counter clock-wise direction for the programmed rotational movement for a certain value, which is derived on eccentricity i.e. half of the cross connecting lever 7a, 7b and which is defined for closed condition of the Sealing Jaws. Sealing Jaws closed position with film in between for sealing is a just touch condition of sealing jaws and considered as film thickness distance value as sealing pressure count. Lesser count than Sealing Jaws closed position just touch condition controls the pressure value lesser than the distance of the film thickness and squeezes the film layers in contact lesser. The movement/travel of jaws further more than the rotation value which is jaws' closed position, exerts penetration pressure for the sealing jaws for the extra sealing pressure required.

Figure 6:
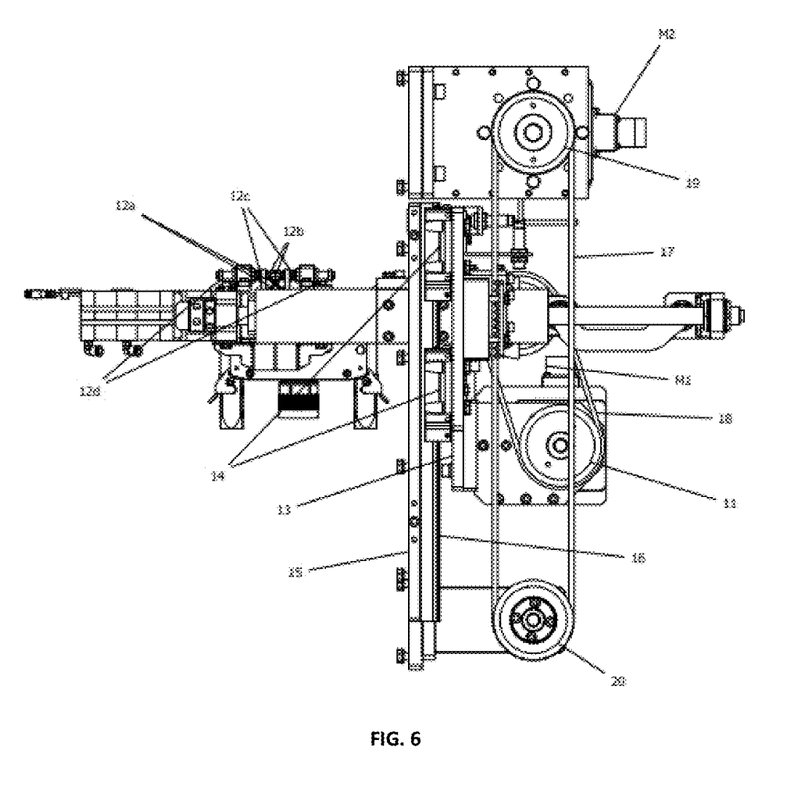
FIG. 6 is a right side view of the cross sealing device in accordance with an embodiment of the present disclosure.

FIG. 6 shows a right side-view of the cross sealing device clearly showing relative arrangement of all components of assembly C with respect to cross sealing table X.

Working of the Invention

The servo Motor M1 controls horizontal back and forth movement of the front seal assembly 1 and rear seal assembly 2 to control sealing operation by controlling distance between them, more specifically distance between the perforation slot 2b and perforation blade 1b. Servo Motor M2 controls the vertical up down movement of the cross sealing table X. The controller synchronizes the operation of servo Motor M1 and servo Motor M2 according to width and draw length of the package to be formed. The controller further synchronizes operation of stripper system D in correspondence with movement of vertical up down movement of the cross sealing table X and horizontal back and forth movement of the front seal assembly 1 and rear seal assembly 2 in a manner that allows stripper system D to firmly grab the film with set clearance to effectively remove Product in seal before sealing operation starts.

FIG. 7a-7e and FIG. 8a-8e illustrates relative motion of stripping system D and cross sealing station A through operation of servo motor M1, while cross sealing table X is vertically moving up and down via controlled operation of servo motor M2. In a prefer embodiment of the invention, the package is being sealed while items to be packed is filling inside the package and the package is also simultaneously stripped with set clearance downside. This arrangement enables sealing to be performed while the package is still filling and travelling, which allows more package to be effectively prepared in short period of time as the sealing is continuously performed in synchronization with package manufacturing. In contrast to prior cross sealing device which are configured to perform sealing while being at a fixed position, and vertical movement of the cross sealing table X allows package sealing to be formed, while package is filled and travelling downward is more time savvy operation saving lots of efforts and cost.

Figures 7, 7E:
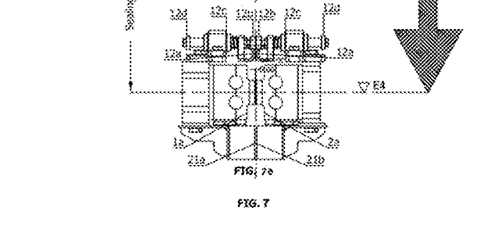
Figure 7A:
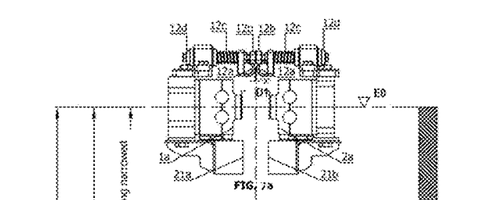

FIG. 7a-7d shows downward cycle of cross sealing table X and stripper system D while performing sealing operation, i.e. where first seal jaws and second seal jaws are coming closer to each other to be in closed position to form seal. At this time, the cross sealing table X is travelling downside along with package being filled. FIG. 7a shows downward cycle of movement of cross sealing table X from home elevation (E0) at top also defined as datum Zero. At this point, the Sealing Jaws are set to be apart at a predetermined distance D1 as per width of the package to be formed. The predetermined distance D1 can range from 10-20 mm, more preferably 10 mm.

Figure 7B:
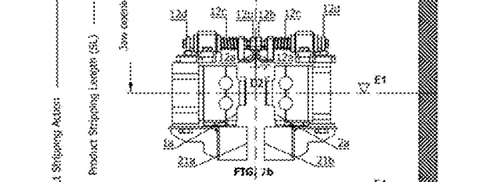

FIG. 7b shows seal jaws coming closer up to a predetermined distance D2 which results in narrowing of the opening formed between the jaws, while the Stripper rods 12b stays apart at set clearance. Cross sealing table X is travelling downward up to few mm defined as elevation E1 from the home position (E0). E1 can be up to 10 mm downward from E0.

Figure 7C:
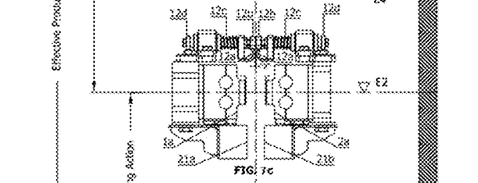
Figure 7D:
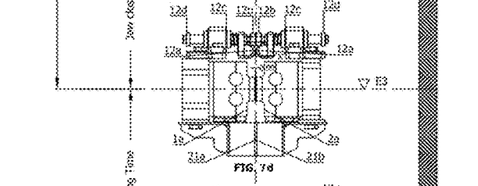

FIG. 7c shows seal jaws are maintained at the predetermined distance D2 while cross sealing table X is travelling downward up to Elevation E2. This allows stripper rods 12b be in action to push the items floating in the package with set clearance for the film. This action is continued up to Elevation E2 which can be also defined as the stripping length (SL).

After stripping action is completed seal jaws are configured to move toward each other to be in sealing position (See FIG. 7d) while cross sealing table X is travelling up to the Elevation E3. Sealing is continued until the cross sealing table X reaches Elevation E4 (See FIG. 7e), which is equal to Total table travel length (TL). Each of Elevation E1-E3 is predetermined by controller set values for the sealing and stripping parameters.

Figure 8:
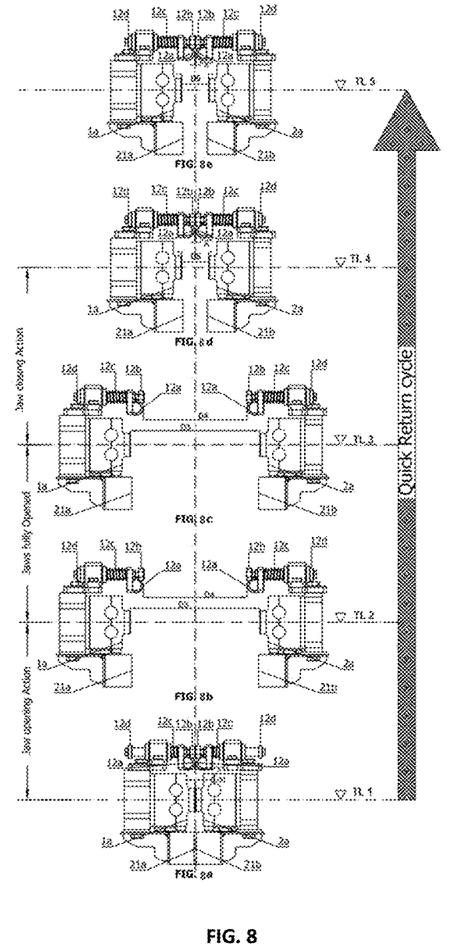

Similarly, FIG. 8a-8e shows upward cycle of cross sealing table X and stripper system D after sealing operation has been performed, i.e., where first seal jaws and second seal jaws are retracting away from each other i.e. disengaged or in open position allowing forming gap therebetween which allows formed package to travel downward therebetween and cross sealing table X is travelling upside to start next cycle to produce next package. For ease of reference, upside stroke of the cross sealing table X is divided into Table Length TL10, TL2, TL3, TL4. Illustratively as shown in FIG. 8a, after sealing has been performed, seal jaws are starting to open and cross sealing table X starts upward motion from Table Length TL1 up to Table length TL2. As shown in FIGS. 8b and 8c, both seal jaws and stripper rods 12b are maintained at distance D3 and D4 respectively while cross sealing table X is travelling upward up to Table Length TL3. In a preferred embodiment of the invention, distance D3 and D4 is fully retracted state of both seal jaws and stripper rods 12b respectively, which allows formed package to travel downward without any resistance. Distance D3 and D4 is preset by controller as per width of the package to be formed. Distance D3 may range from 80-180 mm, more preferably 180 mm. D4 may range from 60-140 mm, more preferably 140 mm.

As shown in FIGS. 8d and 8e, at TL-4, cross sealers, i.e., front seal assembly 1 and second seal assembly 2, are starting to close up to distance D5, while stripper rods 12b are in closed position with set clearance. TL-5 being home position, where cross sealing table X stops for a moment to prepare for downward cycle grabbing next package to be formed. Distance D5 being same as distance D1.

Figure 9:
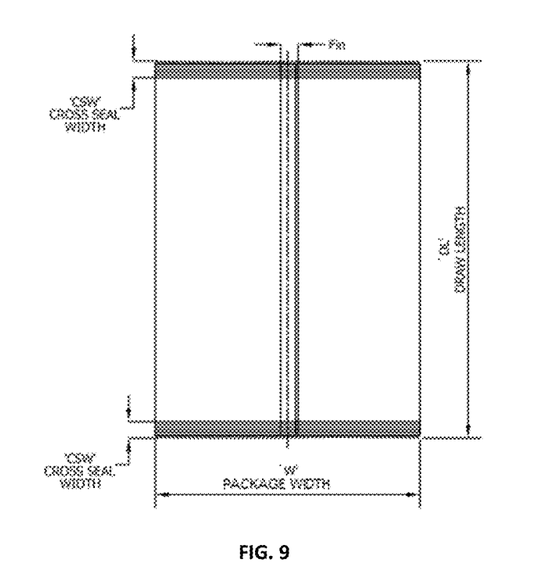
FIG. 9 shows schematic representation of different package parameters used by the cross sealing device according to a preferred embodiment of this invention.

FIG. 9 shows schematic representation of package parameters used by controller to determine stripping length according to a preferred embodiment of this invention. Stripping Length (SL) is determined as per Equation 1

$$SL = EL \times F \quad (Eq. 2)$$

wherein EL being effective length is calculated using Equation 2.

$$EL = DL - 2 \times CSW \quad (Eq. 2)$$

Here, CSW is cross seal width determined as per the package to be prepared.

F is Factor of Stripping is determined as per the draw length of the package.

| DL Draw Lenge | F Factor of Stripping |
|---|---|
| 50-150 | 0.43 |
| >150 | 0.36 |

In a preferred embodiment of the invention, the cross seal device 100 is used with a Vertical Form Fill Seal Machine known in the art to increase the packaging capacity. However, use of the cross sealing device 100 with any machine, device, apparatus or like for the same purpose in a same or similar manner is within the scope of this application.

A vertical reciprocating up-down cross sealing table X movement i.e. a cross seal vertical up down control assembly C [Servo Motor Axis—2] & seal jaws on horizontal reciprocating with a toggle assembly B i.e. a cross sealing station A [Servo Motor Axis—1] which produces the top and bottom seal of consecutive packages. That is top end of one package and the bottom end of the next package is sealed simultaneously. First seal jaw 1a, and second seal jaw 2a are operated with servo controlled toggle assembly B based horizontal movements, which ensures creation of a controlled opening gap depending on pouch width between the First seal jaw 1a and the second seal jaw 2a to clear filled pouch to travel through and at engagement for sealing ensures controlled sealing pressure. Two parameters of sealing i.e. Sealing Pressure & Sealing Time are well controlled to suit processing requirements. Cross sealing table X up-down Reciprocating Movement is servo controlled synchronized with Continuous Servo driven Vacuum Assisted Timing Belts driven Film Draw, the table travel length (TL) is controlled depending upon package length that is manufactured. Vertical Seal on package is performed in a continuously moving web. The Cross sealing jaws are single servo motor driven and have controlled oscillation movement and no cranking motion. The cross sealing device is more rugged and uses less linkages.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

We claim:

1. A cross sealing device (100) comprising:
 a cross sealing table (X), wherein the cross sealing table (X) is comprising:
  a cross sealing station (A) comprising:
   a front seal assembly (1) comprising a first seal jaw (1a) with a perforation blade (1b); and
   a rear seal assembly (2) comprising a second seal jaw (2a) with a perforation slot (2b) configured to receive the perforation blade (1b) upon engagement with the first seal jaw (1a);
   a pair of parallel linear motion rods (4a, 4b), wherein the front seal assembly (1) is fixedly mounted at a front end of the pair of parallel linear motion rods (4a, 4b), and a back connecting plate (10) is fixedly mounted at a rear end thereof; and
  a toggle assembly (B) comprising:
   a sealing drive shaft (5) provided perpendicularly between the pair of parallel linear motion rods (4a, 4b);
   a pair of cross connecting lever (7a, 7b) fixedly mounted with a sealing drive shaft (5);
   a first pair of C shaped actuator levers (6c, 6d) fixedly connected with the rear seal assembly (2) at a front end thereof;
   a second pair of C shaped actuator levers (6a, 6b) fixedly connected with the back connecting plate (10) at a rear end thereof, wherein the rear end of the first pair of C shaped actuator levers (6c, 6d) and a back end of the second pair of C shaped actuator levers (6a, 6b) are rotatably connected with each of the pair of cross connecting lever (7a, 7b) at opposite ends thereof;
   a first timing pulley (11) mounted on the sealing drive shaft (5) to control oscillation of the sealing drive shaft (5); and
   a first servo motor (M1) configured to control oscillation of the first timing pulley (11); and
  a cross seal vertical up down control assembly (C) comprising a cross seal up down plate (13) which slides on a pair of linear motion rails (16) mounted on a rail mounting plate (15) at one end via a pair of parallel linear motion guide blocks (14) wherein the cross seal up down plate (13), at another end, is fixed with a timing belt (17) which is oscillating vertically on a first driver timing pulley (19) and a second driven timing pulley (20) attached with the rail mounting plate (15).

2. The device as claimed in claim 1, further comprises an up-down drive shaft (22) and a second servo motor (M2) to control vertical movement of the cross sealing station on the pair of linear motion rails (16) mounted on the rail mounting plate (15).

3. The device as claimed in claim 2, the second servo motor (M2) controls vertical movement of the cross sealing station by controlling reciprocation of the cross seal up down plate (13) by the driver timing pulley (19) over the rail mounting plate (15) depend upon a length of a pouch to be manufactured.

4. The device as claimed in claim 1, wherein the first pair of C shaped actuator levers (6c, 6d) are configured to pull back the rear seal assembly (2) upon rotation of the sealing drive shaft (5) in clockwise direction, to disengage the front seal assembly (1) and the rear seal assembly (2).

5. The device as claimed in claim 1, wherein the first pair of C shaped actuator levers (6c, 6d) are configured to advance the rear seal assembly upon rotation of the sealing drive shaft (5) in counter-clockwise direction, to engage the front seal assembly (1) and the rear seal assembly (2).

6. The device as claimed in claim 1, wherein the pair of parallel linear motion rods (4a, 4b) are configured to disengage the front seal assembly (1) from the rear seal assembly (2) upon forward sliding of the back connecting plate (10).

7. The device as claimed in claim 1, wherein the pair of parallel linear motion rods (4a, 4b) are configured to engage the front seal assembly (1) and the rear seal assembly (2) upon rearward sliding of the back connecting plate (10).

8. The device as claimed in claim 1, wherein the first servo motor (M1) is configured to control horizontal movement of the front seal assembly (1) and the rear seal assembly (2) by controlling rotation of the sealing drive shaft (5) via the first timing pulley (11).

9. The device as claimed in claim 1, wherein the toggle assembly (B) enables the front seal assembly (1) and the rear seal assembly (2) to horizontally reciprocate in a controlled rotation manner with a crank eccentricity value half of a length of the pair of cross connecting lever (7a, 7b).

10. The device as claimed in claim 9, wherein an opening (g) created between the front seal assembly (1) and the rear seal assembly (2) has a maximum distance up to 180 mm which is four times the crank eccentricity value.

11. The device as claimed in claim 1, further comprises an up-down drive shaft (22) and a second servo motor (M2) to control vertical movement of the cross sealing station on the pair of linear motion rails (16) mounted on the rail mounting plates-plate (15) depend upon a length of a pouch to be manufactured.

12. The device as claimed in claim 1, further comprises a stripping system (D) comprising a pair of stripper rods (12a), a pair of stripper stoppers (12b), a pair of stripper springs (12c) and two pairs of spring stoppers (12d).

13. The device as claimed in claim 12, the stripping system (D) has each of the pair of stripper rods (12a), the pair of stripper stoppers (12b), the pair of stripper springs (12c) and the two pairs of spring stoppers (12d) provided above any one of the first seal jaw (1a) and the second seal jaw (2a) in a position slightly ahead thereof making the pair of stripper rod (12a) be in home position for stripping action with set clearance to start package manufacturing cycle.

* * * * *